United States Patent
Lang et al.

(10) Patent No.: US 11,526,295 B2
(45) Date of Patent: Dec. 13, 2022

(54) MANAGING AN ADJUSTABLE WRITE-TO-READ DELAY OF A MEMORY SUB-SYSTEM

(71) Applicant: Micron Technology, Inc., Boise, ID (US)

(72) Inventors: Murong Lang, San Jose, CA (US); Tingjun Xie, Milpitas, CA (US); Wei Wang, Dublin, CA (US); Frederick Adi, Castro Valley, CA (US); Zhenming Zhou, San Jose, CA (US); Jiangli Zhu, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/934,406

(22) Filed: Jul. 21, 2020

(65) Prior Publication Data
US 2022/0027077 A1 Jan. 27, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .............................. G06F 3/0604; G06F 3/0679
See application file for complete search history.

(56) References Cited

U.S. PATENT DOCUMENTS

| | | | |
|---|---|---|---|
| 2007/0263476 A1* | 11/2007 | Bhushan | G11C 29/50 365/233.5 |
| 2017/0010836 A1* | 1/2017 | Melik-Martirosian | G06F 11/076 |
| 2021/0174886 A1* | 6/2021 | Prakash | G11C 16/26 |

* cited by examiner

*Primary Examiner* — David Yi
*Assistant Examiner* — Nicholas A. Paperno
(74) *Attorney, Agent, or Firm* — Lowenstein Sandler LLP

(57) ABSTRACT

A first operating characteristic and a second operating characteristic of a memory sub-system are determined. A write-to-read delay time is set in view of the first operating characteristic and the second operating characteristic. A read operation associated with a memory unit is executed following a period of at least the write-to-read delay time from a time of an execution of a write operation associated with the memory unit.

20 Claims, 5 Drawing Sheets

MANAGING AN ADJUSTABLE WRITE-TO-READ DELAY OF A MEMORY SUB-SYSTEM

TECHNICAL FIELD

Embodiments of the disclosure relate generally to memory sub-systems, and more specifically, relate to managing an adjustable write-to-read delay of a memory sub-system.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
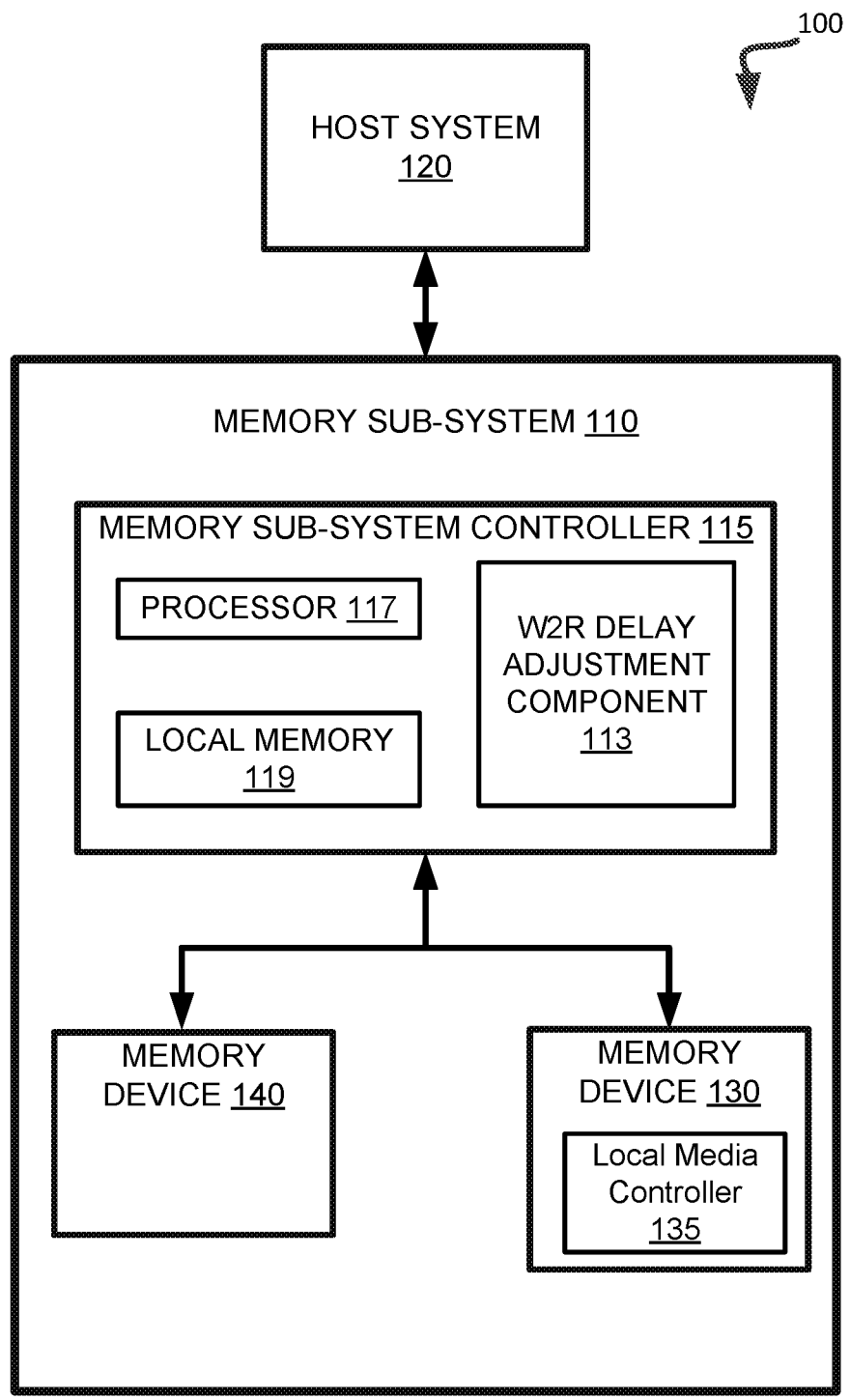
FIG. 1 illustrates an example computing system that includes a memory sub-system in accordance with some embodiments of the present disclosure.

Aspects of the present disclosure are directed to managing an adjustable write-to-read delay of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices. The host system can provide data to be stored at the memory sub-system and can request data to be retrieved from the memory sub-system.

The memory devices can be non-volatile memory devices, such as three-dimensional cross-point ("3D cross-point") memory devices that are a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1.

Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states. The various logic states have corresponding threshold voltage levels. A threshold voltage (VT) is the voltage applied to the cell circuitry (e.g., control gate at which a transistor becomes conductive) to set the state of the cell. A cell is set to one of its logic states based on the VT that is applied to the cell. For example, if a high VT is applied to an SLC, a charge will be present in the cell, setting the SLC to store a logic 0. If a low VT is applied to the SLC, charge will be absent in the cell, setting the SLC to store a logic 1.

For certain memory types (i.e., for memory sub-systems employing certain types of storage media), error rates can vary over time. In particular, some non-volatile memories have threshold voltage programming distributions that move or "drift" higher over time. At a given read voltage level (i.e., a value of the voltage applied to a memory cell as part of a read operation), if the threshold voltage programming distributions move, then certain reliability statistics can also be affected. One example of a reliability statistic is a bit error rate (BER). The BER can be defined as the ratio of the number of erroneous bits to the number of all data bits stored in a unit of the memory sub-system, where the unit can be the entire memory sub-system, a die of memory device, a collection of codewords, or any other meaningful portion of the memory sub-system.

A read operation can be performed with a read voltage level. The read threshold voltage level or value (herein the "read voltage level") can be a particular voltage that is applied to memory cells of a memory device to read the data stored at the memory cells. For example, if a threshold voltage of a particular memory cell is identified as being below the read voltage level that is applied to the particular memory cell, then the data stored at the particular memory cell can be a particular value (e.g., '1') and if the threshold voltage of the particular memory cell is identified as being above the read voltage level, then the data stored at the particular memory cell can be another value (e.g., '0'). Thus, the read voltage level can be applied to memory cells to determine values stored at the memory cells.

In a conventional memory sub-system, when the threshold voltage programming distributions of a memory cell change, the application of the read voltage level can be inaccurate relative to the changed threshold voltage. For example, a memory cell can be programmed to have a threshold voltage below the read voltage level. The programmed threshold voltage can change over time and can shift to be above the read voltage level. For example, the threshold voltage of the memory cell can shift from initially being below the read voltage level to being above the read voltage level. As a result, when the read voltage level is applied to the memory cell, the data stored at the memory cell can be misread or misinterpreted to be at a wrong value as compared to the value as originally stored when the threshold voltage had not yet shifted.

The speed or rate of the drift of the threshold voltage programming distributions and corresponding BER of a conventional memory sub-system can be affected by one or more operating characteristics of the memory sub-system. Example operating characteristics include die temperature and a write-to-read (W2R) delay time (i.e., a period of time that a controller waits after a memory unit of the memory device (e.g., a memory page) is written before the same memory unit can be read).

For example, the drift speed is faster at higher die temperatures than at lower temperatures when experiencing a same W2R delay time. In another example, longer W2R delay times produce greater threshold voltage drifts as compared to shorter W2R delay times. In this example, the read retry trigger rate (i.e., a rate of errors that trigger error correction processing) is higher for longer W2R delay times than it is for shorter W2R delay times. Conventional memory sub-systems establish a static, non-adjustable minimum W2R delay time (herein the "W2R delay") for use during an entire lifecycle of a memory device. The minimum W2R delay is set to satisfy an acceptable BER for the memory device. The preset minimum W2R delay (e.g., 25 μs) is constant and unchanged during multiple different lifecycle stages of the memory device, including a beginning of life (BOL) stage, a middle of life (MOL) stage, and an end of life stage (EOL). In operation, the controller is forced to wait for the entire W2R delay time between a same memory unit (e.g. a same page) write operation and read operation. Accordingly, the W2R delay causes system performance degradation since the subsequent read operation is forced to wait.

In conventional systems, the static W2R delay is determined based on a worst case scenario associated with an acceptable BER assuming the memory device is operating in an EOL stage. However, this approach causes the memory sub-system to operate inefficiently during the BOL and MOL stage where a much shorter W2R delay could be implemented without sacrificing BER margin. As such, performance during multiple lifecycle stages (e.g., the BOL and MOL stages) of the memory sub-system suffers due to the application of a predetermined and constant W2R delay throughout the entire lifecycle of the memory sub-system.

Aspects of the present disclosure address the above and other deficiencies by having a memory sub-system that identifies an optimized read voltage level (or read voltage level range) that minimizes or reduces a BER corresponding to a threshold voltage programming distribution experiencing drift due to a set of operating characteristics (i.e., a current set of values of the one or more operating characteristics). In particular, an optimized read voltage level can be determined as a function of a set of values of the operating characteristics (e.g., the W2 W delay time, the W2R delay time, the temperature, and the cycling information) of the memory sub-system.

Advantages of the present disclosure include, but are not limited to, improved performance during multiple lifecycle stages (e.g., a BOL stage and MOL stage) by adjusting a W2R delay in view of operating characteristics of the memory sub-system. Advantageously, an adjusted W2R delay can be identified and applied based on the one or more operating characteristics of the memory sub-system, such as a temperature level and a lifecycle stage. The adjustment of the W2R delay based on operating characteristics improves the efficiency and performance during the BOL and MOL stages, while maintaining desired BER levels.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a W2R delay adjustment component 113 that can be used to adjust a W2R delay based on one or more operating characteristics of a memory sub-system. In some embodiments, the controller 115 includes at least a portion of the W2R delay adjustment component 113. For example, the controller 115 can include a processor 117 (processing device) configured to execute instructions stored in local memory 119 for performing the operations described herein. In some embodiments, the W2R delay adjustment component 113 is part of the host system 120, an application, or an operating system. In the same or alternative embodiments, portions of the W2R delay adjustment component 113 are part of the host system 120 while other portions of the W2R delay adjustment component 113 are performed at the controller 115.

The W2R delay adjustment component 113 can be used to identify a temperature level associated with one or more memory dies and a lifecycle stage of the memory sub-system 110. In an embodiment, multiple lifecycle stages can be established and defined by a number of write/read cycles of the memory sub-system 110. For example, the memory sub-system 110 can be in a first lifecycle stage (e.g., a BOL stage) when operating at a cycle count that is less than a first threshold cycle level (e.g., 50K cycles). A second lifecycle stage (e.g., a MOL stage) is established when the memory sub-system 110 is operating between the first threshold cycle level (e.g., 50K cycles) and a second threshold cycle level (e.g., 100K cycles). A third lifecycle stage (e.g., an EOL stage) is established when the memory sub-system 110 is operating between the second threshold cycle level (e.g., 50K cycles) and a third threshold cycle level (e.g., 100K cycles). According to an embodiment, the BOL stage can be identified in response to determining a current cycle count satisfies a threshold criterion (e.g., is less than) associated with a first threshold cycle count level of a set of cycle count threshold levels. According to an embodiment, the MOL stage can be identified in response to determining a current cycle count satisfies a threshold criterion associated with a second threshold cycle count level of a set of cycle count threshold levels. According to an embodiment, the EOL stage can be identified in response to determining a current cycle count satisfies a threshold criterion associated with a third threshold cycle count level of a set of cycle count threshold levels.

In an embodiment, W2R delay adjustment component 113 can monitor a cycle count (e.g., a first operating characteristic) and a temperature level (e.g., a second operating characteristic) of the memory sub-system 110. In an embodiment, the identified cycle count is compared to a set of cycle count threshold levels to determine a lifecycle stage of the memory sub-system. In an embodiment, if the identified cycle count (e.g., a current cycle count of the memory sub-system 110) satisfies a first condition or criterion, the W2R delay adjustment component 113 can determine the memory sub-system 110 is in a first lifecycle stage. In an embodiment, the first condition is satisfied when the identified cycle count is less than a first threshold cycle level. In an embodiment, if the identified cycle count satisfies a second condition or criterion, the W2R delay adjustment component 113 can determine the memory sub-system 110 is in a second lifecycle stage. In an embodiment, the second condition is satisfied when the identified cycle count is between the first threshold cycle level and a second threshold cycle level. In an embodiment, if the identified cycle count satisfies a third condition, the W2R delay adjustment component 113 can determine the memory sub-system 110 is in a third lifecycle stage. In an embodiment, the third condition is satisfied when the identified cycle count is between the second threshold cycle level and a third threshold cycle level. Although described in the examples herein with three lifecycle stages, it is noted that any number of lifecycle stages can be defined and identified in accordance with embodiments of the present disclosure.

In an embodiment, the W2R delay adjustment component 113 can measure or identify a second operating characteristic of the memory sub-system, where the second operating characteristic is a temperature level of one or more memory dies of one or more memory devices 130, 140 of the memory sub-system 110. In an embodiment, the second operating characteristic (i.e., the temperature level) is determined in response to determining the first operating characteristic satisfies a threshold criterion associated with one of a first threshold level or a second threshold level In an embodiment, based on the identified lifecycle stage and temperature level, the W2R delay adjustment component 113 identifies and establishes a corresponding W2R delay. In an embodiment, the W2R delay adjustment component 113 identifies a minimum W2R delay corresponding to the measured temperature level and identified lifecycle stage. Advantageously, during operation of the memory sub-system 110, the W2R delay adjustment component 113 determines a current set of operating characteristic values (e.g., the temperature level and the lifecycle stage) and, using a data structure (e.g., via a look-up operation), identifies a corresponding W2R delay. In an embodiment, the W2R delay can be adjusted as a function of the temperature and lifecycle stage of the memory device 130, 140 to establish a shorter or lower W2R delay for the BOL stage and a longer or higher W2R delay for the EOL stage to maximize efficiency while maintaining a desired BER level.

Furthermore, the W2R delay adjustment component 113 counteract threshold voltage drift due to the operating characteristics while adjusting the W2R delay during multiple stages of a full lifecycle of the memory sub-system 110. Further details relating to the operations of the W2R delay adjustment component 113 are described below.

Figure 2:
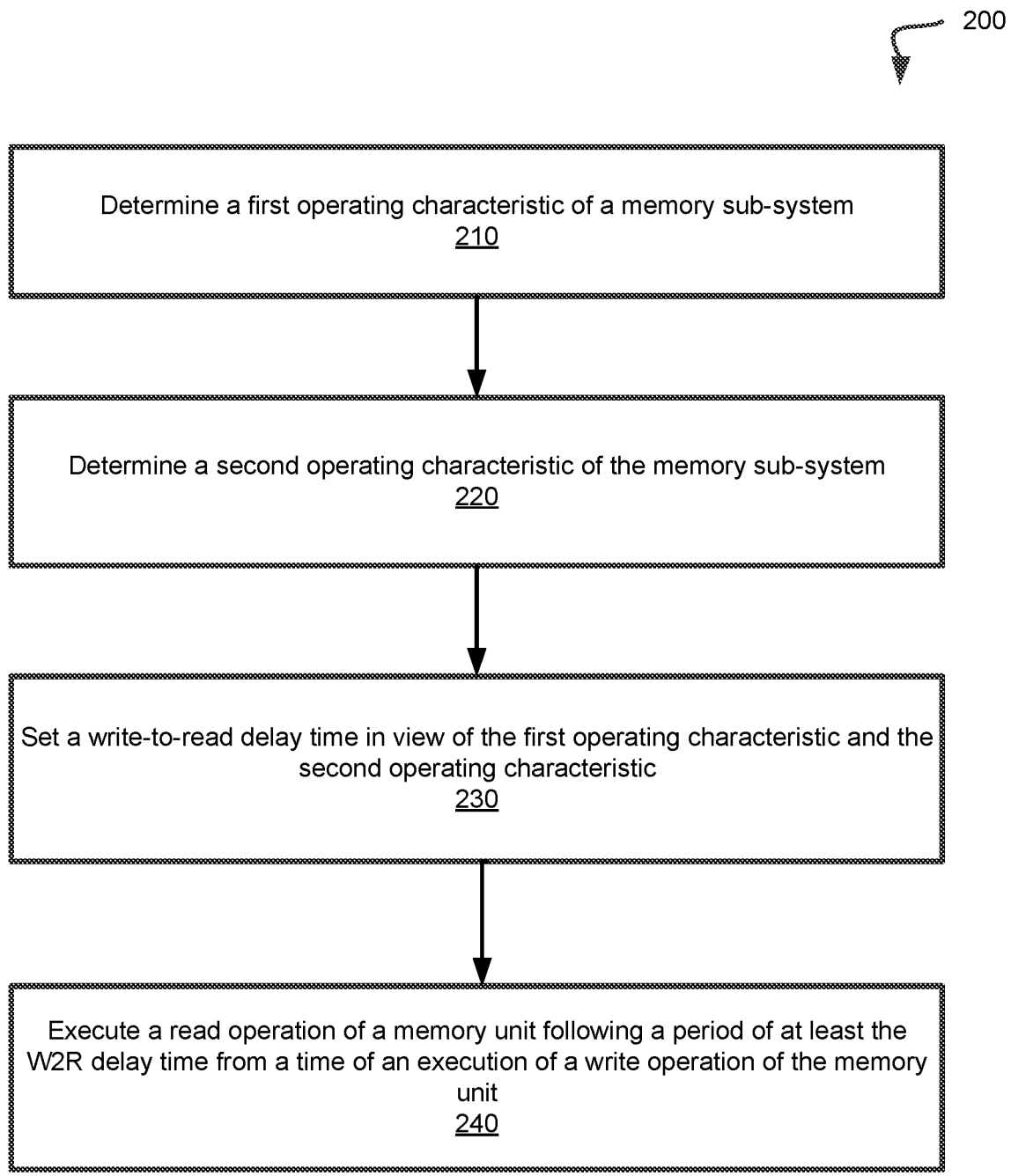
FIG. 2 is a flow diagram of an example method to set a write-to-read delay time in view of operating characteristics of a memory sub-system in accordance with some embodiments.

FIG. 2 is a process flow diagram of an example method 200 to identify and establish a W2R delay time in view of a set of operating characteristics of a memory sub-system in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the W2R delay adjustment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic determines a first operating characteristic of a memory sub-system. In an embodiment, the first operating characteristic can be a measured, determined or calculated value or level corresponding to a characteristic or condition of the memory sub-system during operation of the memory sub-system. In an embodiment, the first characteristic can be an operational level or condition that effects a threshold voltage drift of the memory sub-system. For example, as described in greater detail below with respect to FIGS. 3 and 4, the first operating characteristic can be cycle count of the memory sub-system.

At operation 220, the processing logic determines a second operating characteristic of the memory sub-system. In an embodiment, the second operating characteristic is a condition or measured level of the memory-system relating to a variable that impacts or influences threshold voltage drift. For example, as described in greater detail below with respect to FIGS. 3 and 4, the second operating characteristic can be a temperature level associated with the memory sub-system.

At operation 230, the processing logic sets a W2R delay time in view of the first operating characteristic and the second operating characteristic. In an embodiment, using the set of identified operating characteristics, the processing logic can adjust, change, set or establish a W2R delay time based on changes and conditions in the memory sub-system. Advantageously, the determination of an in-operation characteristics enables the W2R delay time to be optimized in view of changing conditions during the operation of the memory sub-system, such as the lifecycle stage and temperature level.

At operation 240, the processing logic executes a read operation of a memory unit following a period of at least the W2R delay time from a time of an execution of a write operation of the memory unit. In an embodiment, the W2R delay time set in operation 230 can be implemented as an updated or adjusted minimum delay time between the execution of a write operation and the execution of a read operation involving a same memory unit (e.g., a memory page). In an embodiment, the setting and implementing of an adjustable W2R delay time in view of a set of operating characteristics improves on systems having a static and rigid W2R delay time by accounting for actual performance characteristics of the memory sub-system, such as lifecycle stage (e.g., a current cycle count) and temperature level.

Figure 3:
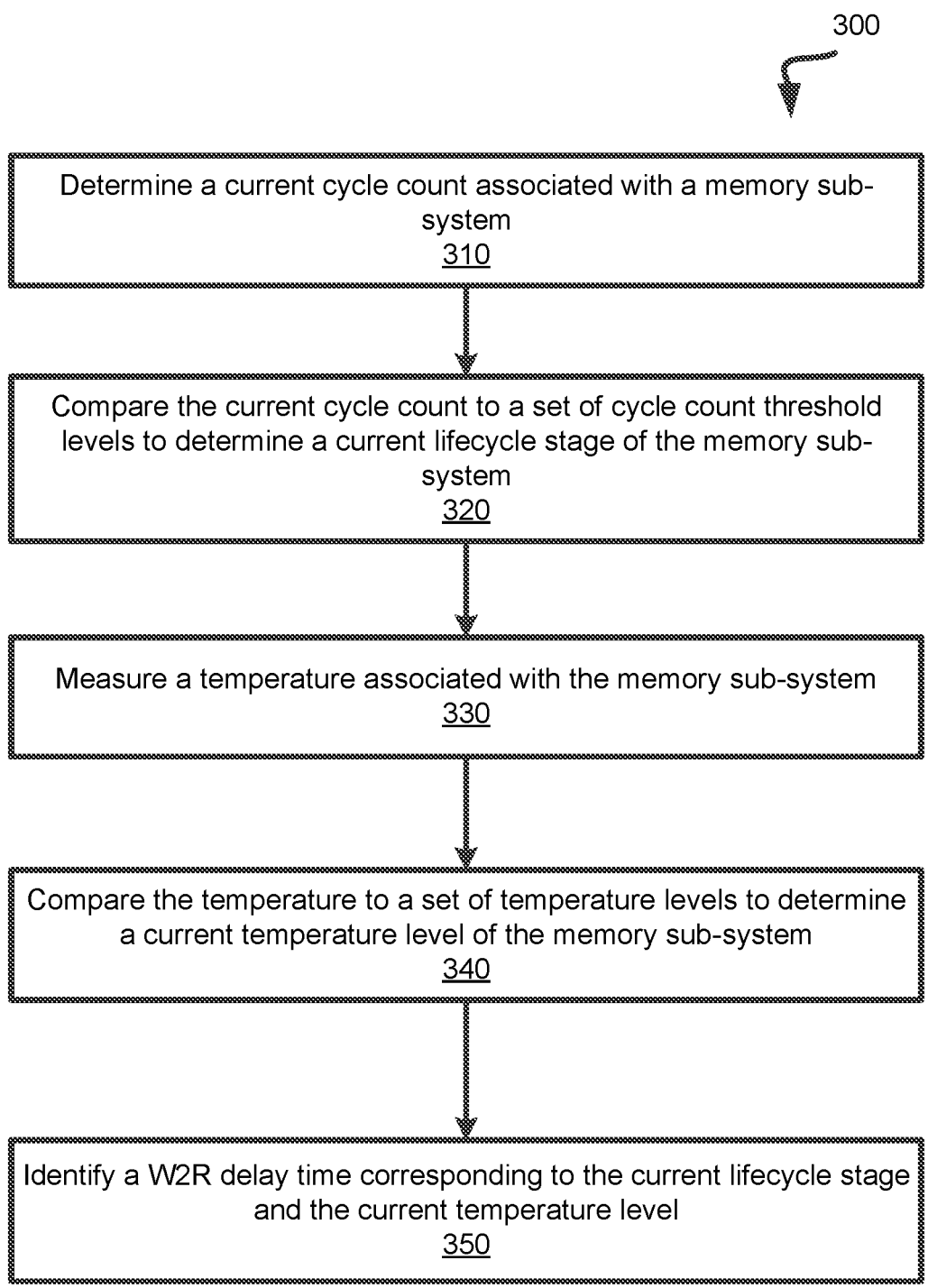
FIG. 3 is a flow diagram of an example method to set a write-to-read delay time in view of a lifecycle stage and temperature level of a memory sub-system in accordance with some embodiments.

FIG. 3 is a process flow diagram of an example method 300 to identify a W2R delay time in view of a set of operating characteristics (e.g., a cycle count and temperature level) of a memory sub-system in accordance with some embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the W2R delay adjustment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 3, at operation 310, the processing logic determines a current cycle count associated with a memory sub-system. In an embodiment, the current cycle count represents a number of write/read cycles performed by the memory sub-system. In an embodiment, a counter tracking a number of cycles performed by the memory sub-system can be maintained and accessed to determine a current cycle count of the memory sub-system.

At operation 320, the processing logic compares the current cycle count to a set of cycle count threshold levels to determine a current lifecycle stage of the memory sub-system. In an embodiment, the lifecycle stages can include a BOL stage, a MOL stage, and an EOL stage. In an embodiment, the memory sub-system can be identified as being in a first lifecycle stage (e.g., the BOL stage) if the current cycle count is below a first threshold level (e.g., 50 k cycles). In an embodiment, the memory sub-system can be identified as being in a second lifecycle stage (e.g., the MOL stage) if the current cycle count is below a second threshold level (e.g., 100 k cycles). In an embodiment, the current lifecycle stage can be identified as the MOL stage if the current cycle count is between the first threshold level and the second threshold level (e.g., in a range of 50 k to 100 k cycles). In an embodiment, the memory sub-system can be identified as being in a third lifecycle stage (e.g., the EOL stage) if the current cycle count is below a third threshold level (e.g., 200 k cycles). In an embodiment, the current lifecycle stage can be identified as the EOL stage if the current cycle count is greater than the second threshold level (e.g., greater than 100 k cycles). In an embodiment, the current lifecycle stage can be identified as the EOL stage if the current cycle count is between the second threshold level and the third threshold level (e.g., in a range of 100 k to 200 k cycles).

At operation 330, the processing logic measures a temperature associated with the memory sub-system. In an embodiment, the temperature can be measured for one or more memory dies of the memory sub-system. In an embodiment, the measured or current temperature can be detected using a temperature detector component associated with the set of memory dies of the memory sub-system. In an embodiment, the second operating characteristic (e.g., the temperature level) is determined in response to determining the first operating characteristic (e.g., the cycle count) satisfies a threshold criterion associated with one of a first threshold level or a second threshold level. In an embodiment, the processing logic can measure the temperature level in response to determining that the current cycle count reaching a check point level (e.g., threshold level 1 or threshold level 2).

At operation 340, the processing logic compares the temperature to a set of temperature levels to determine a current temperature level of the memory sub-system. In an embodiment, the set of temperature levels can include a first temperature level (e.g., 50° C. or higher), a second temperature level (e.g., between 26° C. and 49° C.) and a third temperature level (e.g., 25° C. or lower). It is noted that any number of temperature levels can be defined and implemented, including different temperature ranges and thresholds.

At operation 350, the processing logic identifies a W2R delay time corresponding to the current lifecycle stage and the current temperature level. In an embodiment, the set of operating characteristics (e.g., the current lifecycle stage and the current temperature level) can be used to identify a corresponding W2R delay time. In an embodiment, the processing logic can maintain a data structure identifying a W2R delay time corresponding to the respective combinations of the current lifecycle stage and the current temperature level.

In an example, selected values of each of the operating characteristics (e.g., values of 50 microseconds ($\mu s$), 10 seconds (s), 1 hour (hr) can be established for the W2 W delay time and the W2R delay time; values of 0 degrees Celsius (C), 25° C., and 70° C. can be established for the die temperature; and values of 1, 10K, and 100K can be established for the cycling condition).

Figure 4:
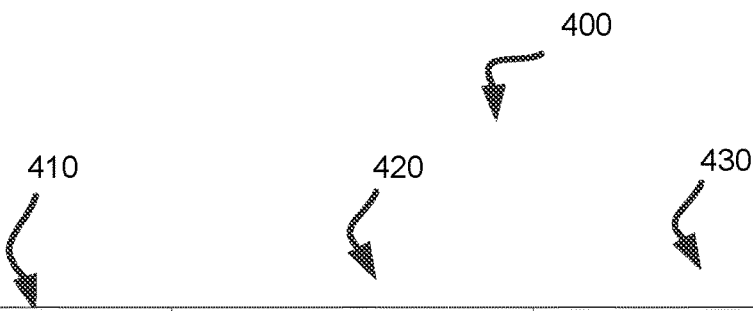
FIG. 4 illustrates a table including example write-to-read delay times corresponding to example sets of operating characteristic values of a memory sub-system in accordance with some embodiments.

FIG. 4 illustrates an example data structure 400 including a first operating characteristic 410 (e.g., a current lifecycle stage as determined, for example, based on a current cycle count in operations 310 and 320 of FIG. 3) and a second operating characteristic 420 (e.g., a current temperature level as determined, for example, in operations 330 and 340 of FIG. 3) associated with a corresponding W2R delay level 430. As shown in FIG. 4, the data structure 400 (e.g., a table) identifies a W2R delay level (e.g., W2R level 1 through W2R level 9, where W2R level 9 is a higher value (e.g., a longer delay time) than W2R level 1) for each combination or pair of lifecycle stage and temperature level. For example, if in method 300, it is determined that the current cycle count is 61 k cycles and the measured temperature of one or more memory dies is 46° C., the processing logic determines the memory sub-system is operating in a second lifecycle stage (e.g., MOL stage) at temperature level 2 (e.g., within a range of 26° C. to 49° C.). Using the data structure, in this example, the processing logic identifies and sets the W2R delay time to W2R level 5. Advantageously, the processing logic can dynamically adjust or set the minimum W2R delay time throughout the lifetime of the memory sub-system based on the operating characteristics of the memory sub-system to improve performance in the BOL and MOL lifecycle stages. The dynamic adjustment of the minimum W2R delay time establishes a shorter W2R delay time (e.g., W2R level 1, 2, or 3) during the BOL stage as compared to the EOL stage to improve the BOL performance while maintaining desired BER reliability criteria during the EOL stage.

In an embodiment, the data structure (e.g., a table) 400 is stored in a data store (e.g., a fuse ROM of the memory sub-system) operatively coupled to the W2R delay adjustment component 113 of FIG. 1. As shown in FIG. 4, multiple different sets of values for the multiple operating characteristics 410, 420 are established and a corresponding optimized W2R delay level 430 is identified and stored. In an embodiment, the processing logic identifies the W2R delay time to be applied and implemented in the memory sub-system by executing a look-up operation using the data structure 400 to determine the W2R delay level corresponding to the determined lifecycle stage and temperature level. In an embodiment, the identified W2R delay level can be applied by waiting a minimum duration of time corresponding to the W2R delay level between execution of a write operation associated with a memory unit (e.g., a memory page) and execution of a read operation associated with the same memory unit (e.g., the same memory page).

Figure 5:
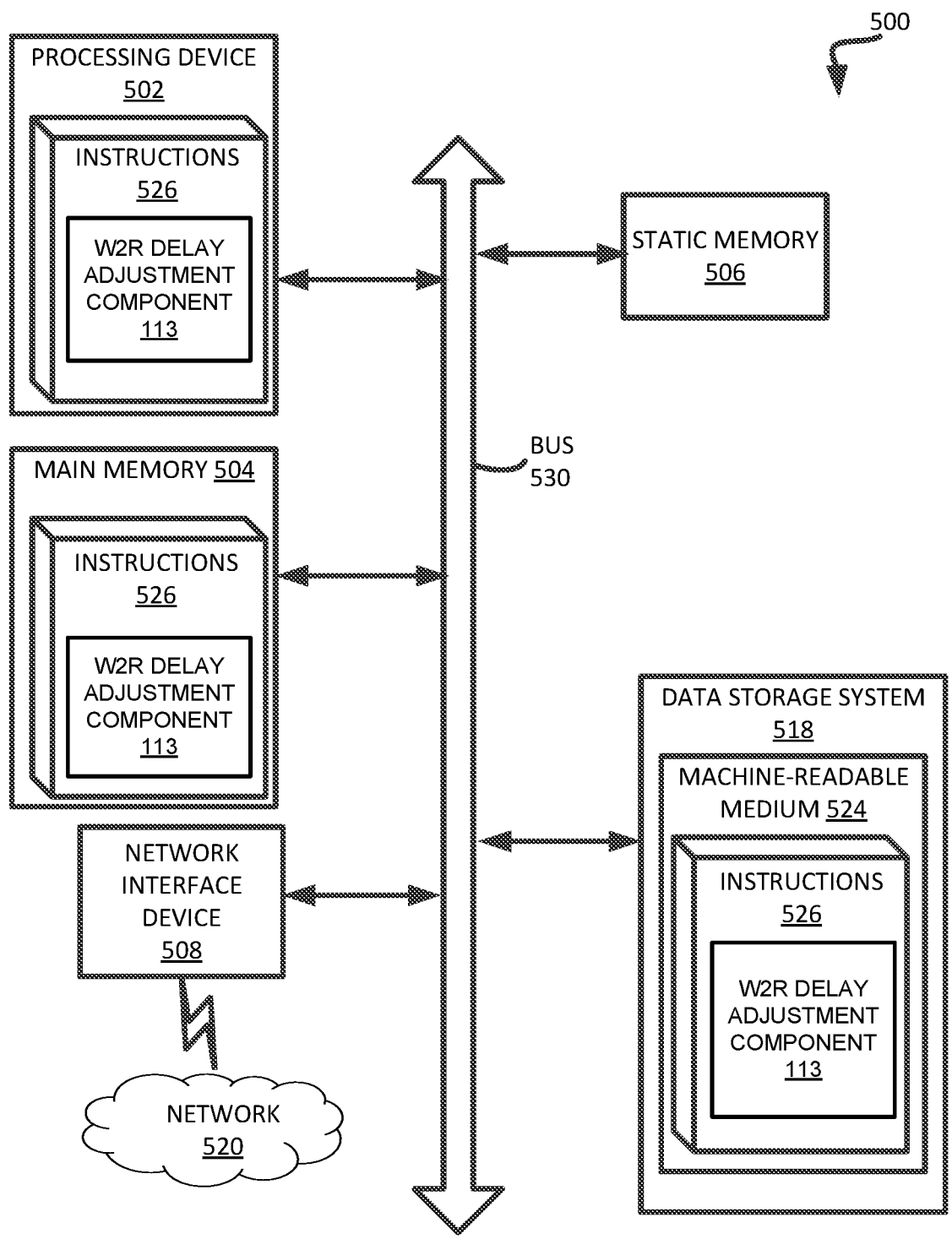
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a W2R delay adjustment component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a read voltage adjustment component (e.g., the W2R delay adjustment component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining a first value of a first operating characteristic of a memory sub-system;
   determining a second value of a second operating characteristic of the memory sub-system;
   identifying, in a data structure, a first threshold level corresponding to the first value of the first operating characteristic;
   in response to identifying the first threshold level, identifying, in the data structure, a second threshold level corresponding to the second value of the second operating characteristic;
   selecting, from the data structure, a write-to-read (W2R) delay time corresponding to the first threshold level and the second threshold level; and
   executing, by a processing device, a read operation associated with a memory unit of the memory sub-system, following a period of at least the W2R delay time from a time of an execution of a write operation associated with the memory unit.

2. The method of claim 1, wherein the first operating characteristic comprises a lifecycle stage of the memory sub-system.

3. The method of claim 2, further comprising:
   determining the lifecycle stage by comparing a current cycle count of the memory sub-system to a set of threshold levels comprising the first threshold level, wherein the lifecycle stage is one of a first lifecycle stage, a second lifecycle stage, or a third lifecycle stage.

4. The method of claim 2, wherein the second operating characteristic comprises a temperature level of the memory sub-system.

5. The method of claim 4, further comprising:
   maintaining the data structure comprising a plurality of W2R delay times, wherein each W2R delay time corresponds to a set of values corresponding to the first operating characteristic and the second operating characteristic.

6. The method of claim 5, further comprising:
   executing a look-up operation using the data structure to determine the W2R delay time corresponding to the lifecycle stage and the temperature level.

7. The method of claim 1, wherein the second operating characteristic is determined in response to determining the first operating characteristic satisfies a threshold criterion associated with one of a first threshold level or a second threshold level.

8. A system comprising:
   a memory component; and
   a processing device, operatively coupled with the memory component, to:
   determine a first value of a first operating characteristic of a memory sub-system;
   determine a second value of a second operating characteristic of the memory sub-system;
   identify, in a data structure, a first threshold level corresponding to the first value of the first operating characteristic;
   in response to identifying the first threshold level, identify, in the data structure, a second threshold level corresponding to the second value of the second operating characteristic;
   select, from the data structure, a write-to-read (W2R) delay time corresponding to the first threshold level and the second threshold level; and
   execute a read operation associated with a memory unit following a period of at least the W2R delay time from a time of an execution of a write operation associated with the memory unit.

9. The system of claim 8, wherein the first operating characteristic comprises a lifecycle stage of the memory sub-system.

10. The system of claim 9, wherein the processing device is further to determine the lifecycle stage by comparing a current cycle count of the memory sub-system to a set of threshold levels comprising the first threshold level, wherein the lifecycle stage is one of a first lifecycle stage, a second lifecycle stage, or a third lifecycle stage.

11. The system of claim 9, wherein the second operating characteristic comprises a temperature level of the memory sub-system.

12. The system of claim 11, wherein the processing device is further to maintain the data structure comprising a plurality of W2R delay times, wherein each W2R delay time corresponds to a set of values corresponding to the first operating characteristic and the second operating characteristic.

13. The system of claim 12, wherein the processing device is further to execute a look-up operation using the data structure to determine the W2R delay time corresponding to the lifecycle stage and the temperature level.

14. The system of claim 9, wherein the second operating characteristic is determined in response to determining the first operating characteristic exceeds one of a first threshold level or a second threshold level.

15. A non-transitory computer readable medium comprising instructions, which when executed by a processing device, cause the processing device to perform operations comprising:
- determining a first value of a first operating characteristic of a memory sub-system;
- determining a second value of a second operating characteristic of the memory sub-system;
- identifying, in a data structure, a first threshold level corresponding to the first value of the first operating characteristic;
- in response to identifying the first threshold level, identifying, in the data structure, a second threshold level corresponding to the second value of the second operating characteristic;
- selecting, from the data structure, a write-to-read (W2R) delay time corresponding to the first threshold level and the second threshold level; and
- executing a read operation associated with a memory unit of the memory sub-system, following a period of at least the W2R delay time from a time of an execution of a write operation associated with the memory unit.

16. The non-transitory computer readable medium of claim 15, wherein the first operating characteristic comprises a lifecycle stage of the memory subsystem.

17. The non-transitory computer readable medium of claim 16, the operations further comprising determining the lifecycle stage by comparing a current cycle count of the memory sub-system to a set of threshold levels comprising the first threshold level, wherein the lifecycle stage is one of a first lifecycle stage, a second lifecycle stage, or a third lifecycle stage.

18. The non-transitory computer readable medium of claim 16, wherein the second operating characteristic comprises a temperature level of the memory subsystem.

19. The non-transitory computer readable medium of claim 18, the operations further comprising maintaining the data structure comprising a plurality of W2R delay times, wherein each W2R delay time corresponds to a set of values corresponding to the first operating characteristic and the second operating characteristic.

20. The non-transitory computer readable medium of claim 19, the operations further comprising executing a look-up operation using the data structure to determine the W2R delay time corresponding to the lifecycle stage and the temperature level.

* * * * *